(No Model.) 2 Sheets—Sheet 1.
D. P. KANE.
REVERSING DEVICE FOR ENGINES.
No. 376,658. Patented Jan. 17, 1888.
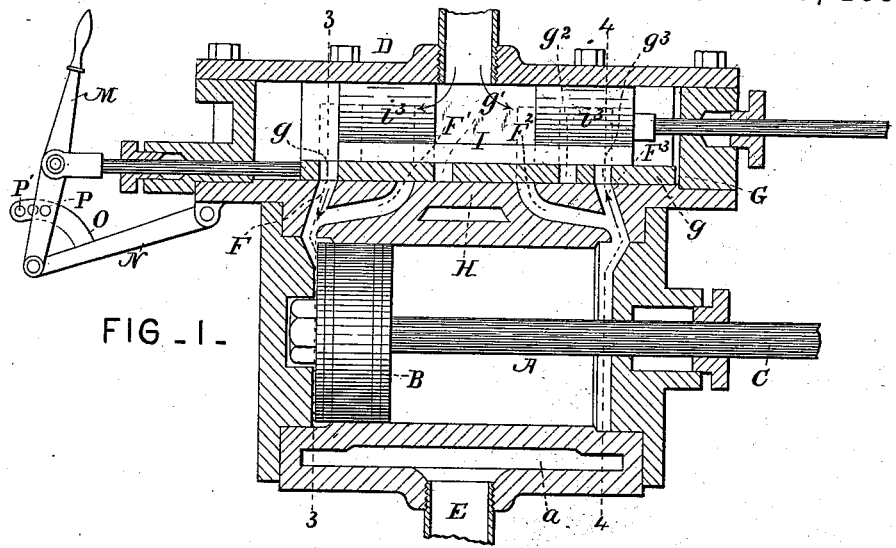
FIG. 1.
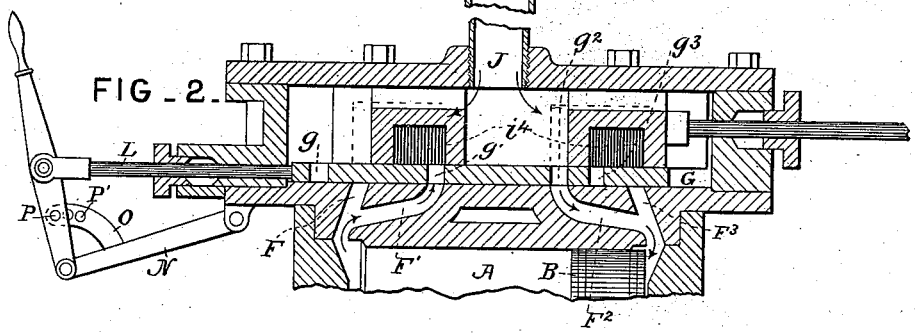
FIG. 2.
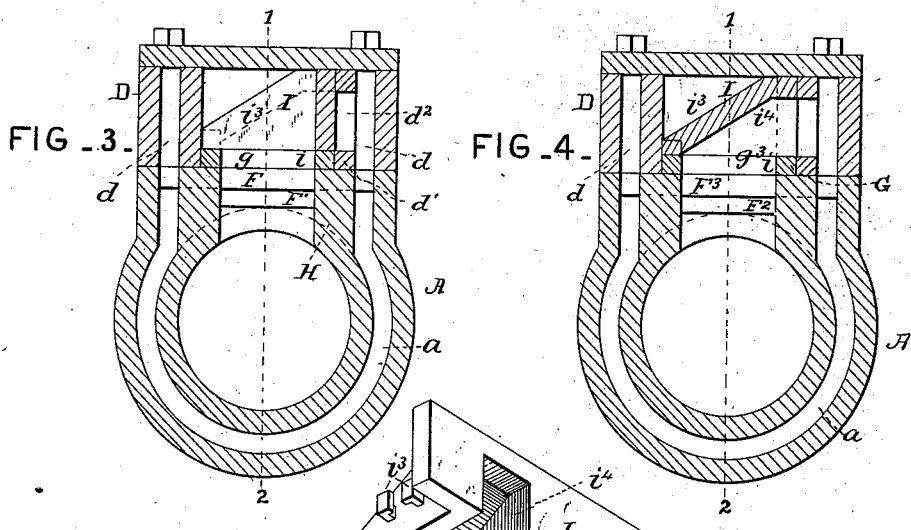
FIG. 3.   FIG. 4.
FIG. 5.
Attest:
Jas. K. McCathran
H. S. Knight
Inventor:
Daniel P. Kane.
By Knight Bros.
attys.

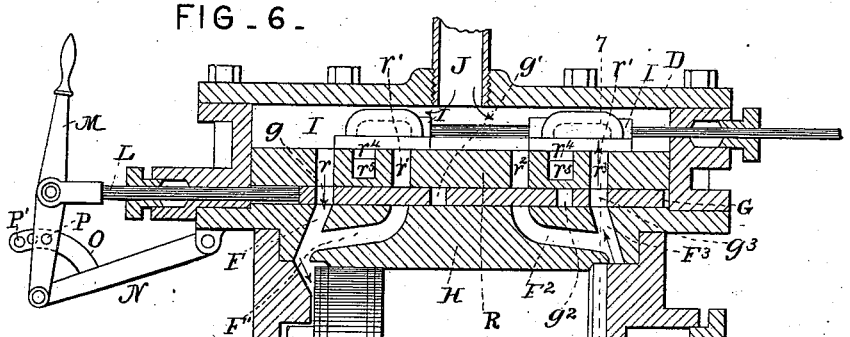
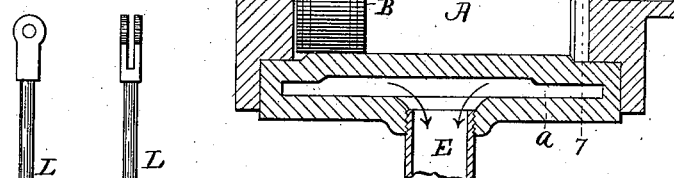
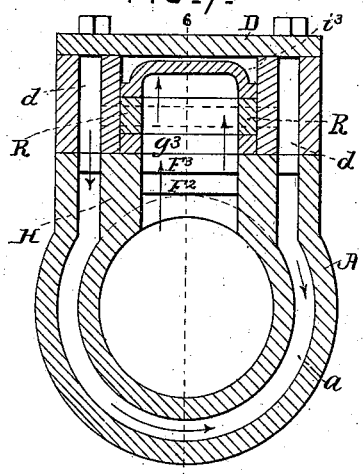
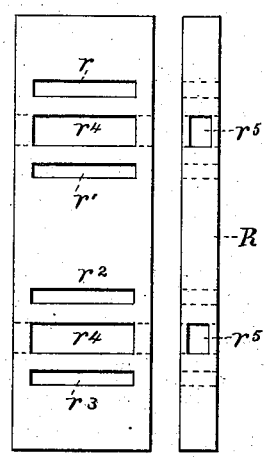
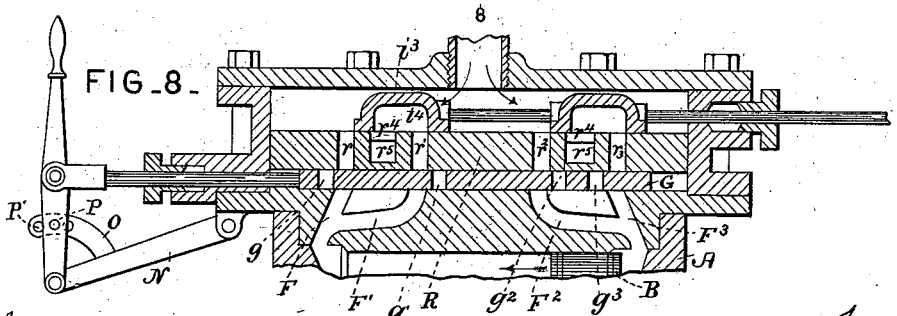

UNITED STATES PATENT OFFICE.

DANIEL P. KANE, OF ST. LOUIS, MISSOURI.

REVERSING DEVICE FOR ENGINES.

SPECIFICATION forming part of Letters Patent No. 376,653, dated January 17, 1888.

Application filed January 13, 1887. Serial No. 224,311. (No model.)

*To all whom it may concern:*

Be it known that I, DANIEL P. KANE, of the city of St. Louis, State of Missouri, have invented a certain new and useful Improvement in Reversing-Valves for Engines, of which the following is a full, clear, and exact description, reference being had to the accompanying drawings, forming part of this specification, and in which—

Figure 1 is a longitudinal section at 1 2, Figs. 3 and 4, except that the slide-valve is shown in side view. Fig. 2 is a detail longitudinal section at 1 2, showing the reversing-valve in the opposite position to that shown in Fig. 1. Fig. 3 is a transverse section at 3 3, Fig. 1. Fig. 4 is a transverse section at 4 4, Fig. 1. Fig. 5 is an under perspective view of the slide-valve. Fig. 6 is a longitudinal section at 6 8, Fig. 7, except that the slide-valve is shown in side view. Fig. 7 is a transverse section at 7 7, Fig. 6. Fig. 8 is a transverse section at 6 8, Fig. 7, showing the reversing-valve in the opposite direction to that shown in Fig. 6. Figs. 9 and 10 are respectively side and top views of the reversing-valve. Figs. 11 and 12 are respectively side and top views of the valve-seat block, which is interposed between the slide-valve and the reversing-valve in the modification shown in Figs. 6, 7, and 8.

This invention has a reversing-valve interposed between the cylinder and the slide-valve, and which is moved by a hand-lever to reverse the engine.

A is an engine-cylinder, B a piston, and C the piston-rod. These may have substantially the usual construction.

The construction of the device shown in Figs. 1 to 5, inclusive, and those features common to all the figures will be first described.

D is the steam-chest, made with a vertical longitudinal passage, $d$, on one or both sides, into which the steam exhausts into a steam space or passage, $a$, in the body of the cylinder, and which is in communication with the exhaust-pipe E.

F F' are steam-passages near one end of the cylinder, through which the steam enters and leaves the interior of the cylinder. $F^2 F^3$ are similar steam-passages near the other end of the cylinder for the same purpose.

G is the reversing-valve, working on the seat H of the cylinder, and itself forming a seat for the slide-valve I. The reversing-valve G has passages $g\ g'\ g^2\ g^3$, which may be brought into coincidence with the ports F F' $F^2 F^3$, the ports $g$ and $g^3$ being shown in Fig. 1, respectively, in connection with ports F and $F^3$, and the ports $g'\ g^2$ and $F'\ F^2$ being closed. In Fig. 2 the ports $g'\ g^2$ are in connection with the ports $F'\ F^2$, and the ports $g\ g^3$ and $F\ F^3$ are closed.

The slide-valve I, besides the face $i$, working steam-tight upon the reversing-valve, has a face, $i'$, at right angles to the face $i$, working upon a seat, $d'$, at one side of the valve-chest. This seat has two steam-ports, $d^2\ d^3$, through which the exhaust-steam passes in entering the space or passage $d$. The slide-valve has a central orifice, $i^2$, and at each side of the orifice raised parts $i^3$, in which are cavities $i^4$ for the passage of exhaust-steam from the cylinder.

The slide-valve is shown in the same position in Figs. 1 and 2; but it will be seen that the live steam is in communication with opposite ends of the cylinder, so as to drive the piston in opposite directions, as indicated by the arrows in the steam-passages and on the pistons, which are supposed to be at the beginning of a stroke. To explain, the ports $g$ and F are in line with each other and with the interior of the valve-chest, which contains live steam. The ports $g^3$ and $F^3$ are also in communication with each other and with the exhaust cavity or chamber $i^4$, so that the exhaust-steam escapes by these passages.

When the reversing-valve is in the position shown in Fig. 2, the ports $g^2$ and $F^2$ are in communication with each other and with the steam-chest, and consequently the live steam enters that end of the cylinder, and the parts $g'$ F' are in communication with the exhaust-chamber $i^4$ and passages $d^2$, $d$, and $a$.

J is the steam-pipe, forming communication between the steam-boiler and the steam-chest of the slide-valve, worked by an eccentric or equivalent device.

L is the stem of the reversing-valve, connected to a hand-lever, M, fulcrumed to a rod or bracket, N, which carries a curved guide, O, working through a mortise in the lever. The lever is shown with a pin-hole, P, and the guide with a number of pin-holes, P′, in which a pin may be placed to hold the hand-lever in any position, such positions being shown in Figs. 1, 2, and 8, respectively, the position in Fig. 8 showing all the ports F F′ F$^2$ F$^3$ closed by the reversing-valve, which, with its operative lever, is in the central position.

In the modification shown in Figs. 6, 7, 8, 11, and 12 a block, R, of metal, having the same area as the interior of the steam-chest, is placed between the slide-valve and the reversing-valve and acts as a valve-seat for the slide-valve. The block R has ports $r\ r'\ r^2\ r^3$ extending through it in line with the ports F F′ F$^2$ F$^3$ in Fig. 6. The live steam is shown entering the cylinder through ports $r\ g$ F and exhausting through ports F$^3$, $g^3$, and $r^3$. The slide-valve I in this modification is composed of two D-valves, I$^3$, coupled together, one of them working the ports $r$ and $r'$ and the other working in connection with the ports $r^2$ and $r^3$. The block R has exhaust-ports $r^4$, which are open at top to the chambers $i^4$ of the slide-valve I. The exhaust-ports $r^4$ do not extend through the block R, but branch transversely at $r^5$, said branch passages being in connection with the exhaust-passages $d^2$, leading into the passages $d$. The action of the reversing-valve is precisely the same in this modification as in the other already described.

I claim as my invention—

1. An engine-cylinder having two steam-ports at each end, a slide-valve having two exhaust chambers or cavities, as $i^4$, a reversing-plate between the slide-valve and cylinder, having but four steam-ports so arranged that but two of the cylinder-ports (one at each end) can have communication with the steam-chest at the same time, and two exhaust-ports situated above the reversing-plate, with which the exhaust-chambers $i^4$ communicate, substantially as set forth.

2. The combination, with the cylinder A, the seat H, having four ports, two communicating with each end of the cylinder, and the steam-chest inclosing said seat, of the sliding reversing-plate having but four ports situated at such distances apart that but two of them can be brought into coincidence with but two of the ports in the seat H at the same time, (one communicating with each end of the cylinder,) a slide-valve placed above said plate, adapted to alternately open and close the ports in communication with the respective ends of the cylinder and having exhaust-chambers which communicate with the port which is for the time being closed by the valve, and exhaust-ports above the reversing-plate, with which said chambers communicate, substantially as set forth.

3. The combination, with the cylinder, of the seat H, having two pairs of ports communicating with each end of the cylinder, a reversing-plate having but two pairs of ports for registering with the ports of the cylinder, said ports being so arranged that but one pair of ports in the reversing-plate can register with its corresponding pair of cylinder-ports at the same time, a slide-valve adapted to alternately cover and uncover each cylinder-port and having exhaust-chambers with which the port which is for the time being covered communicates, and exhaust-ports above the reversing-plate, with which the said chambers communicate, substantially as set forth.

4. The combination of the cylinder, the seat H, having a pair of ports communicating with each end of the cylinder, a reversing-plate having two pairs of ports adapted to register alternately with the ports of the seat H, the seat $d'$, having ports communicating with the exhaust, and the valve having the two faces fitting against said seats, and the exhaust-chambers adapted to communicate with all the ports which are open for operation, substantially as set forth.

5. The combination, with the cylinder and the seat H, having a pair of ports, F F′, communicating with one end thereof, and a pair of ports, F$^2$ F$^3$, communicating with the other end, of a reversing-plate having but four ports, $g\ g'\ g^2\ g^3$, so arranged that when the said plate is at one position one pair of ports, $g\ g^3$, will be in communication with one pair of the cylinder-ports, F F$^3$, when in another position its other pair of ports, $g'\ g^2$, will be in communication with the other pair of cylinder-ports, F′ F$^2$, and when in a third position none of said ports will communicate, as set forth.

DANIEL P. KANE.

Witnesses:
SAML. KNIGHT,
EDW. S. KNIGHT.